Patented Aug. 21, 1945

2,383,236

UNITED STATES PATENT OFFICE 2,383,236

ANTHRAQUINONE DERIVATIVES

Gerard Dunstan Buckley and Henry Alfred Piggott, Blackley, Manchester, England, assignors to Imperial Chemical Industries Limited, a corporation of Great Britain No Drawing. Application June 13, 1942, Serial No. 446,928. In Great Britain July 7, 1941

2 Claims. (Cl. 260—379)

This invention relates to the manufacture and application of new anthraquinone derivatives.

These derivatives are such as carry one or more alkoxyalkoxyalkylamino or alkoxyalkoxyalkoxyalkylamino groups, with 5–10 carbon atoms, attached to the anthraquinone nucleus either directly or through a carbonyl, i. e., CO group, and which may also carry hydroxy, alkoxy, aryloxy, amino, alkylamino, arylamino, hydroxyalkylamino, chloro, bromo and nitro substituents. The alkoxy, alkylamino and hydroxyalkylamino substituents, when present, are such as do not contain more than 5 carbon atoms. Similarly the arylamino substituents consist of anilino, toluidino and xylidino substituents, and the aryloxy substituents of phenoxy and tolyloxy ones.

According to the invention we make the said new derivatives by interacting an alkoxyalkoxyalkylamine or an alkoxyalkoxyalkoxyalkylamine having 5–10 carbon atoms with an anthraquinone derivative which carries one or more replaceable substituents, as further defined below, directly attached to the anthraquinone nucleus, and/or one or more chlorine or bromine atoms attached to the anthraquinone nucleus through a CO group, and which may also carry one or more hydroxyalkylamino or arylamino substituents as defined above.

The said replaceable substituents are hydroxy, alkoxy, aryloxy, amino, alkylamino, chloro, bromo, nitro and sulpho substituents in $\alpha$ positions in the anthraquinone nucleus.

According to a modification of the invention, when the replaceable substituents are hydroxy, amino or alkylamino groups, the anthraquinone derivatives are interacted in the form of their leuco derivatives, or partly in the form of their leuco derivatives, and the resulting products, which are in the form of leuco derivatives or partly in this form, then oxidised to the ordinary quinone form.

Also according to the invention we interact the products of the invention as defined above, when these still carry one or more replaceable substituents, with ammonia, alkylamines or hydroxyalkylamines containing not more than 5 carbon atoms, or with arylamines.

Also according to the invention we reduce the products of the invention when obtained according to the first defined process and also containing an unreplaced nitro substituent, so as to obtain the corresponding amine.

As particular examples of anthraquinone derivatives containing replaceable substituents as defined there may be mentioned quinizarin, 1:4-dimethylaminoanthraquinone, 1:4-diaminoanthraquinone and 1:4:5:8-tetrahydroxyanthraquinone, and their leuco derivatives, 1-amino-4-hydroxy-anthraquinone, 1:4-dibromoanthraquinone, 4-nitro-1-methoxy-anthraquinone, 4-nitro-1-aminoanthraquinone-2-carboxyl chloride and 1-nitro-anthraquinone-2-carboxyl chloride.

The preparation of 4-nitro-1-aminoanthraquinone-2-carboxyl chloride is described in Specification No. 350,928, p. 3, lines 101–121. 1-Nitroanthraquinone-2-carboxyl chloride is prepared by heating 1-nitroanthraquinone-2-carboxylic acid with thionyl chloride in nitrobenzene, and 4-nitro-1-methoxyanthraquinone is prepared by nitration of 1-methoxy-anthraquinone.

The alkoxyalkoxyalkylamines and the alkoxyalkoxyalkoxyalkylamines may be obtained by various methods. $\beta$-Amino-$\beta'$-methoxydiethyl ether and the corresponding ethoxy, butoxy and other alkoxy compounds may be obtained by heating the corresponding $\beta$-chloro-$\beta'$-alkoxydiethyl ethers (prepared by interacting $\beta\beta'$-dichlorodiethyl ether and sodium alkoxides, as described by Cretcher & Pittenger, J. Amer. Chem. Soc., 1925, 47, 164) with aqueous ammonia to 100° C. $\beta$-Aminoethyl-$\beta$-methoxyisopropyl ether may be prepared by interacting methyl $\beta$-hydroxypropyl ether, formaldehyde and hydrochloric acid, treatment of the product with cuprous cyanide, and catalytic hydrogenation of the $\beta$-methoxyisopropoxyacetonitrile thus obtained. $\beta$-Amino-ethyl $\beta\beta'$-dialkoxyisopropyl ethers may be obtained in a similar manner from glycerol 1:3-dialkyl ethers.

The new derivatives are useful as intermediates for dyestuffs and/or as dyestuffs for acetate rayon. As acetate rayon dyestuffs they are, in general, characterised by good penetrating properties, high affinity and good general fastness properties. They possess some solubility in water and their dyeing and printing properties may be improved where necessary by milling with dispersing agents.

The invention also includes the use of the new derivatives for colouring acetate rayon.

The following examples in which parts are by weight illustrate but do not limit the invention.

*Example 1*

30 parts of $\beta$-amino-$\beta'$-methoxydiethyl ether, (NH$_2$.CH$_2$.CH$_2$.O.CH$_2$.CH$_2$.O.CH$_3$) 10 parts of quinizarin, 10 parts of leucoquinizarin, and 150 parts of iso-butanol are boiled together under reflux for 15 hours. 1 part of pyridine is then added and a stream of air is passed through the boiling solution to oxidise the leuco compound.

After cooling, the dyestuff, which separates in blue needles, is filtered off. It is somewhat soluble in water, and after dispersion gives a product which dissolves in water to form clear solutions from which acetate rayon is dyed in bright blue shades of good fastness properties. It consists wholly or mainly of 1:4-di-(β'-methoxy-β - ethoxyethylamino)anthraquinone. The β - amino-β'-methoxydiethyl ether may be replaced by equivalent amounts of β-amino-β'-ethoxydiethyl ether, β-amino-β'-butoxydiethyl ether or β-amino-ethyl-β'-methoxyisopropyl ether, when dyestuffs are obtained, very similar in shade and dyeing properties.

*Example 2*

16.5 parts of diethyleneglycol-methyl-β-aminoethyl ether,

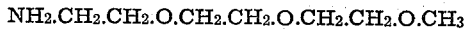

obtainable by condensing ethyleneglycol monomethyl ether with ββ'-dichlorodiethyl ether and reacting the product with ammonia, 4 parts of quinizarin, 4 parts of leucoquinizarin and 30 parts of isobutanol are boiled under reflux for 15 hours, and then oxidised as in Example 1. The product, isolated by evaporation to dryness, is readily soluble in water and dyes acetate rayon in bright blue shades.

*Example 3*

150 parts of diethyleneglycol methyl-β-aminoethyl ether, 100 parts of 1-chloroanthraquinone, 35 parts of potassium carbonate, 1 part of copper acetate and 300 parts of isobutanol are boiled together under reflux for 12 hours. After cooling, the dyestuff, which separates out in the form of red crystals, is isolated by filtration and washed with isopropanol and water. It consists essentially of 1-(β''-methoxy-β'-ethoxy-β-ethoxyethylamino)anthraquinone and dyes acetate rayon in clear yellowish-red shades.

A dyestuff very similar in shade and properties is obtained if the diethyleneglycol methyl β-aminoethyl ether is replaced by the equivalent amount of β-aminoethyl ββ'- dimethoxyisopropyl ether (NH₂CH₂.CH₂OCH(CH₂OCH₃)₂).

*Example 4*

100 parts of 4-bromo-1-methylaminoanthraquinone, 120 parts of diethyleneglycol methyl β-aminoethyl ether, 27 parts of potassium carbonate, 1 part of copper acetate and 120 parts of nitrobenzene are stirred together at 135–140° C. for 12 hours. The mixture is then diluted with 400 parts of isopropanol and cooled to 5° C.; the precipitated dyestuff is filtered off and washed with iso-propanol and cold water. It is readily dispersed in water when mixed with suitable dispersing agents, and dyes acetate silk in reddish blue shades.

*Example 5*

8 parts of β-amino-β'-methoxydiethyl ether, 10 parts of quinizarin, 2 parts of leucoquinizarin and 40 parts of isobutanol are boiled together under reflux for 12 hours. After cooling the dyestuff separates in the form of violet needles and is isolated by filtration. It consists mainly of 4-hydroxy - 1 - β' - methoxy - β - ethoxyethylaminoanthraquinone, and dyes acetate silk in clear violet shades.

*Example 6*

4 parts of sodium anthraquinone-1-sulphonate, 1 part of sodium m-nitrobenzenesulphonate, 8 parts of diethyleneglycol methyl-β-aminoethyl ether and 20 parts of water are stirred and heated together in an autoclave at 160° C. for 6 hours. The mixture is cooled and the red condensation product separated by filtration. It is identical with the product of Example 3.

*Example 7*

8 parts of 1 - nitroanthraquinone - 2 - carboxyl chloride are added to a solution of 16 parts of β-amino-β'-methoxydiethyl ether in 30 parts of isopropanol, and the mixture stirred and heated at 90° C. for 2 hours. After cooling the mixture is poured into 500 parts of water and allowed to stand for some hours. The product, which separates in the form of small red crystals and is isolated by filtration, consists essentially of the dyestuff corresponding with the formula:

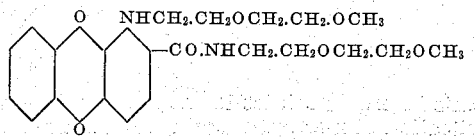

It is somewhat soluble in water, and after dispersion gives a product which dissolves in water to form clear solutions, from which acetate rayon is dyed in bright red shades of good fastness properties.

*Example 8*

24 parts of β-amino-β'-methoxydiethyl ether, 20 parts of leuco-1:4:5:8-tetrahydroxyanthraquinone, 5 parts of boric acid and 75 parts of isobutanol are boiled together under reflux for 12 hours. After oxidation and isolation as described in Example 1, the dyestuff is obtained in the form of bronze plates, and when suitably dispersed it dyes acetate rayon in brilliant blue-green shades.

*Example 9*

50 parts of finely powdered 1-nitroanthraquinone-2-carboxyl chloride are added to a solution of 42 parts of β-amino-β' methoxydiethyl ether in 1000 parts of water, and stirred for several hours in the cold. The product, consisting mainly of the β'-methoxy-β-ethoxyethylamide of 1-nitroanthraquinone-2-carboxylic acid, is filtered off, dried and mixed with a solution of 50 parts of methylamine in 400 parts of ethanol. The mixture is stirred at 60° C. for 6 hours, cooled and the crystalline dyestuff filtered off. It is readily dispersed in water and dyes acetate rayon in bright red shades of excellent fastness properties. The methylamine may be replaced by the equivalent amount of ammonia, which gives a dyestuff of very similar properties but dyeing acetate rayon in brilliant orange shades.

*Example 10*

10 parts of finely powdered 4-nitro-1-aminoanthraquinone-2-carboxyl chloride are added to a solution of 10 parts of β-amino-β' methoxydiethyl ether in 100 parts of water. The mixture is stirred in the cold for several hours and the condensation product consisting essentially of the β'-methoxy-β-ethoxyethylamide of 4-nitro-1-aminoanthraquinone-2-carboxylic acid, is separated by filtration. It is reduced to the corresponding diamino compound by heating at 50° C. with a solution of 17 parts of crystalline sodium sulphide in 100 parts of water. After cooling, filtering and washing with water the dyestuff is isolated as a violet powder. When mixed with suitable dispersing agents it dissolves in water to give clear solutions from which acetate silk is dyed in bright blue-violet shades of excellent fastness properties.

*Example 11*

8 parts of leuco-1:4-dimethylaminoanthraquinone, 16 parts of β-amino-β'-methoxydiethyl ether and 25 parts of isobutanol are boiled together under reflux for 6 hours. The dyestuff, oxidised and isolated as described in Example 1, is obtained in the form of blue needles, identical with the product of Example 1.

The equivalent amount of leuco-1:4-diaminoanthraquinone may be used in place of the dimethyl derivative.

*Example 12*

10 parts of finely divided 4-nitro-1-methoxyanthraquinone, 6.5 parts of β-amino-β'-methoxydiethyl ether and 50 parts of ethyleneglycol monoethyl ether are stirred together at 80° C. for 18 hours. The mixture is then cooled and poured into a large volume of water, and the precipitate is filtered off and dried. The crude product is extracted thoroughly with boiling ethanol and, on cooling, the extract deposits red needles, consisting wholly or mainly of 4-nitro-1-β'-methoxy-β-ethoxyethylaminoanthraquinone. On warming with sodium sulphide solution this is reduced to the corresponding amino compound, which dyes acetate rayon in bright violet shades.

*Example 13*

35 parts of finely powdered 4-bromo-1-aminoanthraquinone-2-carboxyl chloride (prepared according to the method of British Specification No. 492,291) are added to a solution of 30 parts of β-amino-β'-methoxydiethyl ether in 350 parts of water and stirred for several hours. The condensation product, consisting mainly of the β'-methoxy-β-ethoxyethylamide of 4-bromo-1-aminoanthraquinone-2-carboxylic acid, is separated by filtration and washed with water.

A mixture of 100 parts of this amide with 50 parts of potassium acetate, 1 part of copper acetate and 200 parts of aniline is stirred and heated at 120–125° C. for 16 hours. The mixture is then diluted with twice its volume of ethanol and poured into a large volume of dilute hydrochloric acid. After standing for some time the condensation product solidifies and is isolated by filtration. It consists essentially of the β-methoxy-β-ethoxyethylamide of 1-amino-4-anilinoanthraquinone-2-carboxylic acid, and, when suitably dispersed, dyes acetate rayon in blue shades of good fastness properties.

*Example 14*

A mixture of 100 parts of the β'-methoxy-β-ethoxyethylamide of 4-bromo-1-aminoanthraquinone-2-carboxylic acid (prepared as described in Example 13), 50 parts of potassium acetate, 1 part of copper acetate and 200 parts of p-anisidine is stirred and heated at 120–125° C. until a bright blue solution results. The mixture is then cooled, diluted with 1000 parts of ethyl alcohol and allowed to stand until the crystallisation of the condensation product is complete. After filtration and recrystallisation from ethanol the product consisting essentially of the β'-methoxy-β-ethoxyethylamide of 1-amino-4-p-anisidinoanthraquinone-2-carboxylic acid, is obtained in the form of dark blue needles with a metallic lustre. When suitably dispersed it dyes acetate rayon in bright greenish blue shades.

As many widely different embodiments of this invention may be made without departing from the spirit and scope thereof, it is to be understood that we do not limit ourselves to the specific embodiments thereof except as defined in the appended claims.

We claim:

1. The anthraquinone compounds of the formula:

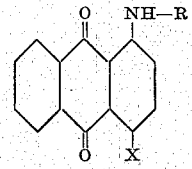

wherein X stands for a substituent of the class consisting of —NHCH₃ and —NHR where in each case R stands for an alkoxy substituted alkyl radical of the group consisting of alkoxy-alkoxy-alkyl- and alkoxy-alkoxy-alkoxy-alkyl-radicals in which the alkoxy substituted alkyl radicals contain from 5 to 10 carbon atoms.

2. 1,4-di-(β'-methoxy-β-ethoxyethylamino)anthraquinone.

GERARD DUNSTAN BUCKLEY.
HENRY ALFRED PIGGOTT.